(12) United States Patent
Bromme et al.

(10) Patent No.: US 9,415,650 B2
(45) Date of Patent: Aug. 16, 2016

(54) CHASSIS CONTROL ARM WITH AN AIR-GUIDING DEVICE

(71) Applicant: AUDI AG, Ingolstadt (DE)

(72) Inventors: Gero Bromme, Hohndorf (DE); Mario Eichler, Zwickau (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/876,446

(22) Filed: Oct. 6, 2015

(65) Prior Publication Data

US 2016/0096409 A1    Apr. 7, 2016

(30) Foreign Application Priority Data

Oct. 7, 2014  (DE) .......................... 10 2014 014 834

(51) Int. Cl.
| | |
|---|---|
| *B60G 7/00* | (2006.01) |
| *B60T 5/00* | (2006.01) |
| *B62D 35/02* | (2006.01) |
| *B62D 37/02* | (2006.01) |
| *F16D 65/12* | (2006.01) |
| *F16D 65/847* | (2006.01) |

(52) U.S. Cl.
CPC . *B60G 7/001* (2013.01); *B60T 5/00* (2013.01); *B62D 35/02* (2013.01); *B62D 37/02* (2013.01); *F16D 65/128* (2013.01); *F16D 65/847* (2013.01); *B60G 2204/4308* (2013.01); *B60G 2206/10* (2013.01)

(58) Field of Classification Search
CPC .............. B60G 7/001; B60G 2206/10; B60G 2204/4308; B62D 35/02; F16D 65/847
See application file for complete search history.

(56) References Cited

U.S. PATENT DOCUMENTS

| | | |
|---|---|---|
| 5,954,405 A | 9/1999 | Toman |
| 9,227,475 B2 * | 1/2016 | Ottinger ................. B60G 7/001 |
| 2007/0096420 A1 | 5/2007 | Lounsberry et al. |

FOREIGN PATENT DOCUMENTS

| | | |
|---|---|---|
| DE | 10 2010 018 779 A1 | 11/2010 |
| DE | 10 2013 002 626 A1 | 8/2014 |
| EP | 0778187 A1 | 10/1996 |
| EP | 2 476 565 A1 | 7/2012 |
| EP | 2 687 389 A1 | 1/2014 |
| JP | H02 39906 U | 3/1990 |
| JP | 2006 056463 A | 3/2006 |
| JP | 2009 196557 A | 9/2009 |

(Continued)

OTHER PUBLICATIONS

European Search Report with respect to counterpart European patent application EP 15 00 2761 issued on Jan. 8, 2016.

(Continued)

*Primary Examiner* — Ruth Ilan
(74) *Attorney, Agent, or Firm* — Henry M. Feiereisen LLC.

(57) ABSTRACT

A chassis control arm includes an air-guiding device, wherein the chassis control arm has at least one terminal bearing section and a middle section, wherein the at least one terminal bearing section has supports for supporting the chassis control arm on a further vehicle component (such as for example a wheel carrier, a subframe, or directly on a vehicle body), wherein the air-guiding device has a flat air-guiding element and a connecting section, wherein the connecting section has at least one elastically bendable connecting element which is detachably fastened on a contact section of the supports, and wherein the contact section protrudes from a side web of the chassis control arm.

7 Claims, 1 Drawing Sheet

(56) References Cited

FOREIGN PATENT DOCUMENTS

| JP | 4924268 B2 | 2/2012 |
| KR | 1020040003821 A | 7/2005 |
| WO | WO 2015/135617 A1 | 9/2015 |

OTHER PUBLICATIONS

English Translation of European Search Report with respect to counterpart European patent application EP 15 00 2761 issued on Jan. 8, 2016.

* cited by examiner

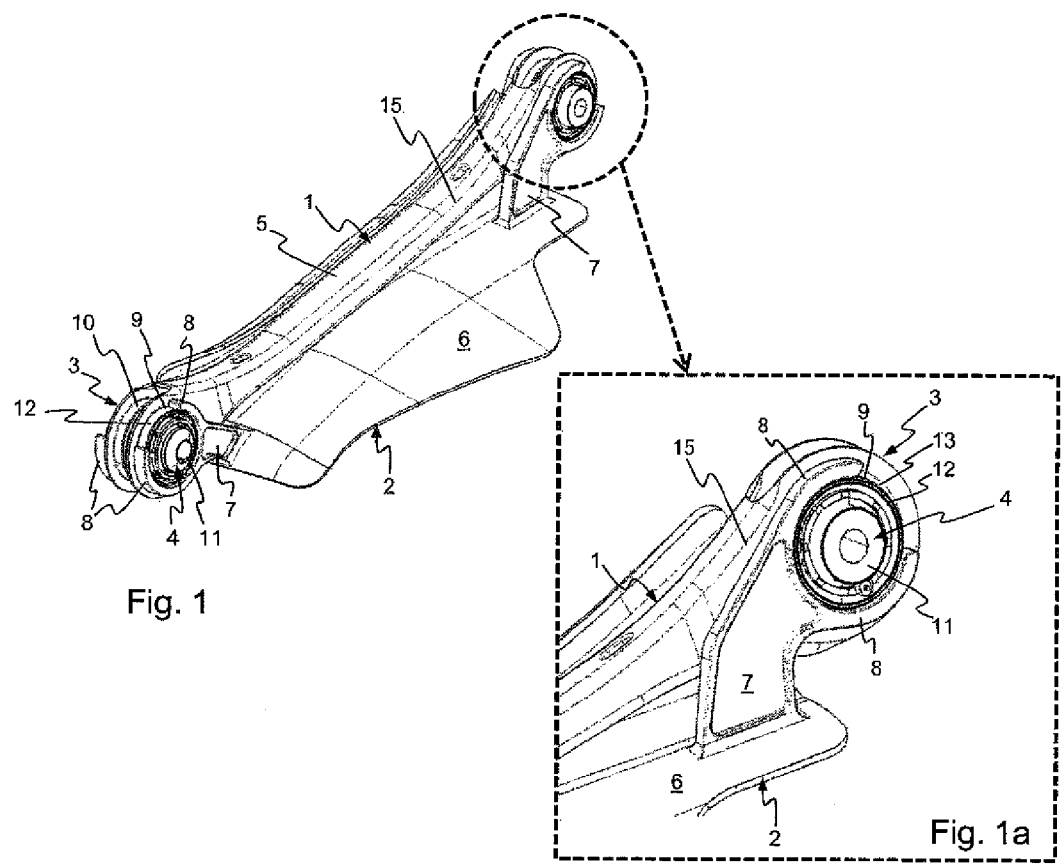
Fig. 1
Fig. 1a
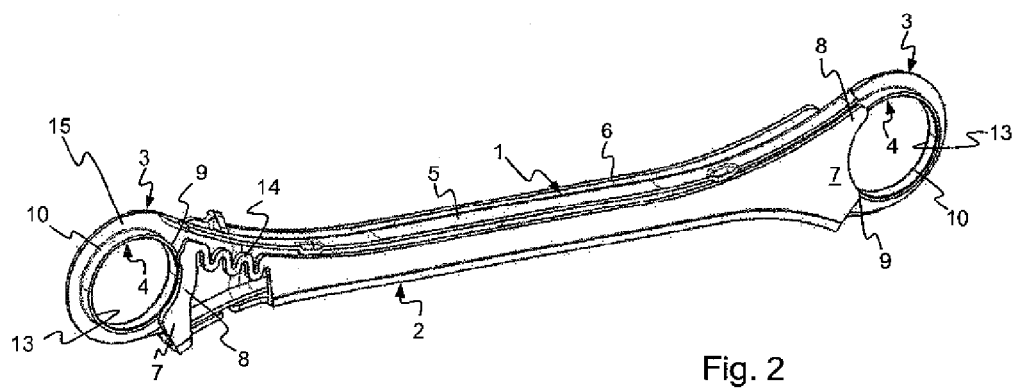
Fig. 2

CHASSIS CONTROL ARM WITH AN AIR-GUIDING DEVICE

CROSS-REFERENCES TO RELATED APPLICATIONS

This application claims the priority of German Patent Application, Serial No. 10 2014 014 834.3, filed Oct. 7, 2014, pursuant to 35 U.S.C. 119(a)-(d), the disclosure of which is incorporated herein by reference.

BACKGROUND OF THE INVENTION

The present invention relates to a chassis control arm with an air-guiding device, wherein the chassis control arm has a terminal bearing section, which has supports for supporting the chassis control arm on a further vehicle part, and a middle section, and wherein the air-guiding device has a flat air-guiding element and a connecting section.

Such chassis control arms, also referred to as transverse control arms or simply control arms, are used in vehicle construction as part of the wheel suspension and can be provided with an air-guiding device, in order to inter alia improve air flow around the underbody in the region of the wheel suspension and to ensure protection against stone impact. The wheel suspension connects the wheel with the vehicle body and guides the wheel while enabling certain degrees of freedom. Chassis control arms can be produced from formed (steel) sheet metals or (formed) extruded sections, for example an extruded section made of aluminum. The chassis control arm has terminal bearing mounts, into which a control arm bearing, preferably configured as rubber-metal-bearing, can be inserted. Depending on the configuration, the bearing mounts can be formed from two concentric through-openings in two parallel extending side webs of the chassis control arm, or they can be formed from a guide sleeve into which the control arm bearing, which is configured as rubber-metal-sleeve bearing, is pressed and which depending on the design of the chassis control arm is welded to the chassis control arm or is held in one or multiple bores in the side webs of the chassis control arm or is integrally formed by a forming process from the material of the chassis control arm.

It would be desirable and advantageous to provide an improved to obviate prior art shortcomings and to provide a chassis control arm with an air-guiding device, wherein the air-guiding device is detachably fastenable on the chassis control arm in a particularly simple manner

SUMMARY OF THE INVENTION

According to one aspect of the present invention, a chassis control arm, includes an air-guiding device, wherein the chassis control arm has at least one terminal bearing section and a middle section, wherein the at least one terminal bearing section has supports for supporting the chassis control arm on a further vehicle component (such as for example a wheel carrier, a subframe, or directly on a vehicle body), wherein the air-guiding device has a flat air-guiding element and a connecting section, wherein the connecting section has at least one elastically bendable connecting element which is detachably fastened on a contact section of the supports, and wherein the contact section protrudes from a side web of the chassis control arm.

Due to the fact that the air-guiding device has at least one connecting section with an elastically bendable connecting element, which is detachably fastenable on a contact section of the supports protruding from a side web of the chassis control arm, the air-guiding device can be simply latchingly engaged with the chassis control arm requiring only a small amount of force and no additional fastening means. By a corresponding pull on the air-guiding device the elastic connecting elements detach again residue-free from the support thus making a replacement very easy.

According to another advantageous feature of the invention, the contact section can be formed by a passage of a bearing opening or an outer sleeve of a sleeve bearing inserted in the bearing opening. Passages can be generated during punching of the bearing openings in the bearing sections of the chassis control arm by a bending operation. They primarily serve for increasing the support surface onto the subsequently inserted sleeve bearing. The passages are bent perpendicular relative to the plane formed by the side web and thus form a particularly advantageous contact section for the complementary connecting elements of the connecting section of the air-guiding device. As an alternative however also the outer sleeve of the sleeve bearing inserted into the bearing opening can be used when the outer sleeve slightly protrudes over the plane of the side web, which allows achieving among other things a form fit also on the side facing away from the passages.

According to another advantageous feature of the invention, the air-guiding element, in the installed state, extends across the bottom side of the chassis control arm. This is very advantageous regarding guidance of the air stream on the underbody of the vehicle and also protects the chassis control arm particularly well against stone impact and touchdown on the underbody. This effect can further be improved when the air-guiding element is pulled upwards on the in driving direction front side of the chassis control arm.

According to another advantageous feature of the invention, the at least one connecting element at least partially engages around the contact section in a form fitting manner. The connecting elements embrace the contact section of the support and can be detached if required.

According to another advantageous feature of the invention, the chassis control arm can have two opposing terminal bearing sections with a middle section arranged there between. This design is also referred to as two-point control arm. The chassis control arm can be produced as sheet metal control arm or an extruded section. For saving weight the wall thickness is to be kept thin and the inside of the chassis control arm is hollow, in particular having a U-shaped cross section.

According to another advantageous feature of the invention, the air-guiding device can have two connecting sections, which clamp the air-guiding device between the contact sections of the two bearing sections. Hereby the connecting sections respectively exert a permanent pressing force onto the associated support and thereby are supported in both directions on the support. In a particularly preferred embodiment one of the connecting sections includes a wave spring. This facilitates installation because the wave spring can be compressed well and still exerts a permanent force on the passage. The wave spring is preferably made of uniform material and formed one-piece in the connecting section.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 1 a perspective view of a first embodiment of the chassis control arm with an air guiding device;

FIG. 1a a detail view of the bearing section of the chassis control arm of FIG. 1;

FIG. 2 a sectional view of a second embodiment of the chassis control arm with an air guiding device.

DETAILED DESCRIPTION OF PREFERRED EMBODIMENTS

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1 and FIG. 1a, there is shown a chassis control arm 1. The chassis control arm has two terminal opposing bearing sections 3 with a middle section 5 situated there between. The chassis control arm 1 is thus constructed as so-called "two-point control arm". The chassis control arm 1 is made of a metal, in particular of a punched and/or bent sheet metal, wherein a single shell construction with two opposing side webs forms a downwardly open U-profile shape. Each of the two bearing sections 3 has two bearing openings 13 arranged coaxial to each other, which are produced by a punching operation and respectively form a passage 10 for increasing the support surface on an outer sleeve 12 of a sleeve bearing 11 inserted into the bearing opening 13. The sleeve bearing 11 is configured as classic rubber-metal-sleeve bearing with a metallic inner sleeve in a metallic outer sleeve 12 and an intermediate rubber layer. The bearing opening 13, the sleeve bearing 11, in particular the outer sleeve 12 and the passages 10 form means 4 for supporting the chassis control arm 1. The air-guiding device 2 is entirely made of plastic and has a flat air-guiding element 6 which serves for guiding the air stream around the chassis control arm 1 during the drive in an aerodynamically advantageous manner and to protect the chassis control arm 1 against stone impact and touchdown on the ground. In the mounted state the air-guiding element 6 extends transversely underneath the chassis control arm 1, especially underneath its middle section 5. On both sides of the air-guiding device 2 a respective connecting section 7 protrudes upwards from the air-guiding element 6. A connecting section 7 has two parallel and symmetrical arms, which bifurcate at their free end to form an elastically bendable connecting element 8. The bendability results from the geometry and the material properties of the connecting elements 8. The connecting elements 8 can be form fittingly pushed onto the outer sleeves 12, which are mounted in the bearing openings 13 and form a contact section 9 with their portion protruding from a side web 15 of the chassis control arm 1, which connecting elements 8 thus hold the air-guiding device 2 on the chassis control arm 1.

Regarding the construction of the chassis control arm 1 of FIG. 2, the same description analogously applies as set forth with regard to FIG. 1. Important in this second embodiment is that the cross sectional profile of at least the middle section 5 is open toward the bottom because the connecting sections 7 of the air-guiding device 2 engage into the hollow space of the chassis control arm 1 from below. Hereby one of the two connecting sections 7 is supported with its connecting element 8, which is configured complementary to the passage 10 of the bearing opening 13, on the contact section 9 of this passage 10. On the opposite side the connecting element 8, which is also configured complementary to the passage 10, is provided with a wave spring 14, which introduces a high elasticity into this connecting section 7. When inserting the connecting sections 7 of the air-guiding device 2 into the chassis control arm 1, the wave spring 14 is compressed and exerts a permanent pressing force onto the passages 10, whereby the air-guiding device 2 is clamped in the chassis control arm 1. The air-guiding element 6 is not fully visible in the present sectional view, however, it extends essentially transversely underneath the middle section 5 of the chassis control arm 1. On the in driving direction front section of the air-guiding element 6, the air-guiding element 6 can be formed so as to be pulled upward in front of the chassis control arm 1. The pulled up region can further form an additional latching engagement with the chassis control arm 1 via a latching nose.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein.

What is claimed is:

1. A chassis control arm, comprising an air-guiding device, said chassis control arm having at least one terminal bearing section and a middle section said at least one terminal bearing section having a support for supporting the chassis control arm on a vehicle component,
said air-guiding device having a flat air-guiding element and a connecting section, said connecting section having at least one elastically bendable connecting element which is detachably fastened on a contact section of the support, said contact section protruding from a side web of the chassis control arm.

2. The chassis control arm of claim 1, wherein the contact section is formed by a passage of a bearing opening or by an outer sleeve of a sleeve bearing inserted into the bearing opening.

3. The chassis control arm of claim 1, wherein the air-guiding element in a mounted state extends across a bottom side of the chassis control arm.

4. The chassis control arm of claim 1, wherein the at least one connecting element at least partially engages form fittingly around the contact section.

5. The chassis control arm of claim 1, wherein the chassis control arm has two opposing said terminal bearing sections, said middle section being arranged between the two bearing sections.

6. The chassis control arm of claim 5, wherein the air-guiding device has two connecting sections, which clamp the air guiding device between the contact sections of the two bearing sections.

7. The chassis control arm of claim 6, wherein one of the connecting sections comprises a wave spring.

* * * * *